US008036991B2

(12) United States Patent
Kuhn et al.

(10) Patent No.: US 8,036,991 B2
(45) Date of Patent: Oct. 11, 2011

(54) REGISTRATION OF A MOBILE COMPUTING DEVICE FOR A SERVICE ON A WIRELESS NETWORK

(75) Inventors: Brian Gerald Kuhn, San Carlos, CA (US); Craig S. Skinner, Snohomish, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/646,750

(22) Filed: Dec. 23, 2009

(65) Prior Publication Data

US 2010/0169217 A1    Jul. 1, 2010

Related U.S. Application Data

(60) Division of application No. 11/646,182, filed on Dec. 27, 2006, which is a continuation of application No. 09/850,940, filed on May 8, 2001.

(51) Int. Cl.
*G06Q 20/00* (2006.01)
(52) U.S. Cl. .......... 705/65; 455/418; 455/419; 455/466; 455/414; 455/557
(58) Field of Classification Search .................... 705/65; 455/414–556; 709/203–220
See application file for complete search history.

(56) References Cited

U.S. PATENT DOCUMENTS

| | | | |
|---|---|---|---|
| 4,779,081 A | 10/1988 | Nakayama et al. | |
| 4,788,675 A | 11/1988 | Jones et al. | |
| 5,010,547 A | 4/1991 | Johnson et al. | |
| 5,012,219 A | 4/1991 | Henry | |
| 5,075,684 A | 12/1991 | DeLuca | |
| 5,134,719 A | 7/1992 | Mankovitz | |
| 5,303,393 A | 4/1994 | Noreen et al. | |
| 5,359,317 A | 10/1994 | Gomez et al. | |
| 5,394,140 A | 2/1995 | Wong et al. | |
| 5,430,436 A | 7/1995 | Fennell | |
| 5,485,505 A * | 1/1996 | Norman et al. | 455/419 |
| 5,612,682 A | 3/1997 | DeLuca et al. | |
| 5,621,784 A | 4/1997 | Tiedemann, Jr. et al. | |
| 5,650,776 A | 7/1997 | Mitchell et al. | |
| 5,705,995 A | 1/1998 | Laflin et al. | |

(Continued)

FOREIGN PATENT DOCUMENTS

EP        0464988 A3    1/1992

(Continued)

OTHER PUBLICATIONS

Initial Provisioning of a Cellular Device over the Air, IBM Technical Disclosure Bulletin, Jun. 1, 1995, pp. 201-202, vol. 38, No. 6, United States of America.

(Continued)

*Primary Examiner* — Calvin Loyd Hewitt, II
*Assistant Examiner* — Cristina Owen Sherr

(57) ABSTRACT

A system and method are disclosed for registering a mobile computing device of a service on a wireless network. The method comprises receiving user information for a user of the mobile computing device and creating an account based on the user information. The method comprises receiving a first key and serial number from the mobile computing device at a network node and generating a second key based on an encryption of a stored serial number of the mobile computing device. Based on an evaluation of the first and second keys and received and stored serial numbers, the mobile computing device is registered on the wireless network for the service.

20 Claims, 8 Drawing Sheets

U.S. PATENT DOCUMENTS

| | | | |
|---|---|---|---|
| 5,758,069 A | 5/1998 | Olsen | |
| 5,787,365 A | 7/1998 | Rivero et al. | |
| 5,819,173 A | 10/1998 | Lawrence et al. | |
| 5,839,054 A | 11/1998 | Wright et al. | |
| 5,850,599 A | 12/1998 | Seiderman | |
| 5,859,419 A | 1/1999 | Wynn | |
| 5,892,900 A * | 4/1999 | Ginter et al. | 726/26 |
| 5,903,852 A | 5/1999 | Schaupp, Jr. et al. | |
| 5,956,636 A * | 9/1999 | Lipsit | 455/411 |
| 5,958,006 A | 9/1999 | Eggleston et al. | |
| 6,000,000 A | 12/1999 | Hawkins et al. | |
| 6,009,409 A | 12/1999 | Adler et al. | |
| 6,035,212 A | 3/2000 | Rostoker et al. | |
| 6,044,403 A | 3/2000 | Gerszberg et al. | |
| 6,047,066 A | 4/2000 | Brown et al. | |
| 6,108,727 A | 8/2000 | Boals et al. | |
| 6,124,799 A | 9/2000 | Parker | |
| 6,141,010 A | 10/2000 | Hoyle | |
| 6,157,630 A | 12/2000 | Adler et al. | |
| 6,157,814 A | 12/2000 | Hymel et al. | |
| 6,175,860 B1 | 1/2001 | Gaucher | |
| 6,208,853 B1 * | 3/2001 | LoVasco et al. | 455/414.1 |
| 6,216,112 B1 | 4/2001 | Fuller et al. | |
| 6,223,030 B1 | 4/2001 | Van Den Heuvel et al. | |
| 6,240,185 B1 | 5/2001 | Van Wie et al. | |
| 6,253,326 B1 | 6/2001 | Lincke et al. | |
| 6,259,405 B1 | 7/2001 | Stewart et al. | |
| 6,282,421 B1 | 8/2001 | Chatterjee et al. | |
| 6,292,833 B1 | 9/2001 | Liao et al. | |
| 6,300,946 B1 | 10/2001 | Lincke et al. | |
| 6,301,666 B1 | 10/2001 | Rive | |
| 6,343,318 B1 | 1/2002 | Hawkins et al. | |
| 6,360,272 B1 | 3/2002 | Lincke et al. | |
| 6,397,246 B1 | 5/2002 | Wolfe | |
| 6,397,259 B1 | 5/2002 | Lincke et al. | |
| 6,425,087 B1 | 7/2002 | Osborn et al. | |
| 6,430,603 B2 | 8/2002 | Hunter | |
| 6,453,371 B1 | 9/2002 | Hampson et al. | |
| 6,457,134 B1 | 9/2002 | Lemke et al. | |
| 6,480,762 B1 | 11/2002 | Uchikubo et al. | |
| 6,490,445 B1 | 12/2002 | Holmes | |
| 6,493,327 B1 | 12/2002 | Fingerhut | |
| 6,519,470 B1 | 2/2003 | Rydbeck | |
| 6,523,124 B1 | 2/2003 | Lunsford et al. | |
| 6,526,275 B1 | 2/2003 | Calvert | |
| 6,539,101 B1 | 3/2003 | Black | |
| 6,549,773 B1 * | 4/2003 | Linden et al. | 455/426.1 |
| 6,560,640 B2 | 5/2003 | Smethers | |
| 6,564,056 B1 | 5/2003 | Fitzgerald | |
| 6,564,104 B2 | 5/2003 | Nelson et al. | |
| 6,581,025 B2 | 6/2003 | Lehman | |
| 6,587,684 B1 | 7/2003 | Hsu et al. | |
| 6,590,588 B2 | 7/2003 | Lincke et al. | |
| 6,591,098 B1 * | 7/2003 | Shieh et al. | 455/419 |
| 6,591,288 B1 | 7/2003 | Edwards et al. | |
| 6,594,482 B1 | 7/2003 | Findikli et al. | |
| 6,594,484 B1 | 7/2003 | Hitchings, Jr. | |
| 6,600,743 B1 | 7/2003 | Lee et al. | |
| 6,603,969 B1 | 8/2003 | Vuoristo et al. | |
| 6,622,017 B1 | 9/2003 | Hoffman | |
| 6,628,928 B1 | 9/2003 | Crosby et al. | |
| 6,628,934 B2 | 9/2003 | Rosenberg et al. | |
| 6,636,489 B1 * | 10/2003 | Fingerhut | 455/419 |
| 6,636,502 B1 | 10/2003 | Lager et al. | |
| 6,675,008 B1 | 1/2004 | Paik et al. | |
| 6,675,165 B1 | 1/2004 | Rothschild | |
| 6,675,202 B1 | 1/2004 | Perttunen | |
| 6,675,204 B2 | 1/2004 | De Boor et al. | |
| 6,681,259 B1 | 1/2004 | Lemiläinen et al. | |
| 6,686,838 B1 * | 2/2004 | Rezvani et al. | 705/80 |
| 6,694,428 B2 | 2/2004 | Lemke et al. | |
| 6,701,521 B1 | 3/2004 | McLlroy et al. | |
| 6,704,295 B1 | 3/2004 | Tari et al. | |
| 6,732,176 B1 | 5/2004 | Stewart et al. | |
| 6,745,011 B1 | 6/2004 | Hendrickson et al. | |
| 6,745,029 B2 | 6/2004 | Einola et al. | |
| 6,795,710 B1 | 9/2004 | Creemer | |
| 6,816,725 B1 | 11/2004 | Lemke et al. | |
| 6,829,560 B2 | 12/2004 | Lehman | |
| 6,829,596 B1 | 12/2004 | Frazee | |
| 6,829,704 B2 | 12/2004 | Zhang et al. | |
| 6,874,017 B1 | 3/2005 | Inoue et al. | |
| 6,880,048 B1 | 4/2005 | Lemke | |
| 6,885,877 B1 | 4/2005 | Ozaki et al. | |
| 6,961,567 B1 | 11/2005 | Kuhn | |
| 6,983,375 B2 | 1/2006 | Zhang et al. | |
| 6,996,407 B2 | 2/2006 | Taniguchi | |
| 7,010,296 B2 | 3/2006 | Sakai et al. | |
| 7,010,603 B2 | 3/2006 | Martin, Jr. et al. | |
| 7,024,464 B1 | 4/2006 | Lusher et al. | |
| 7,089,036 B2 | 8/2006 | Prise | |
| 7,103,370 B1 | 9/2006 | Creemer | |
| 7,173,651 B1 | 2/2007 | Knowles | |
| 7,266,369 B2 | 9/2007 | Moles et al. | |
| 7,266,379 B2 | 9/2007 | Blight et al. | |
| 7,286,251 B2 | 10/2007 | Tomida et al. | |
| 7,359,516 B1 | 4/2008 | Skinner et al. | |
| 7,366,702 B2 | 4/2008 | David | |
| 7,387,771 B1 | 6/2008 | Kratz | |
| 7,536,190 B1 | 5/2009 | Creemer | |
| 7,538,771 B2 | 5/2009 | Nakamura et al. | |
| 7,555,571 B1 | 6/2009 | Skinner | |
| 7,861,009 B2 | 12/2010 | Skinner | |
| 2001/0044310 A1 | 11/2001 | Lincke | |
| 2001/0047272 A1 | 11/2001 | Freitas et al. | |
| 2002/0082049 A1 | 6/2002 | Prise | |
| 2002/0085577 A1 | 7/2002 | Kim | |
| 2002/0177438 A1 | 11/2002 | Sakai et al. | |
| 2003/0050046 A1 | 3/2003 | Conneely et al. | |
| 2004/0254827 A1 | 12/2004 | Hind et al. | |
| 2005/0009514 A1 | 1/2005 | Mathews et al. | |
| 2005/0021458 A1 | 1/2005 | Rowe | |
| 2006/0030306 A1 | 2/2006 | Kuhn | |
| 2006/0116507 A1 | 6/2006 | Oppermann et al. | |
| 2007/0169084 A1 | 7/2007 | Frank et al. | |
| 2007/0178899 A1 | 8/2007 | Kuhn | |
| 2007/0203844 A1 | 8/2007 | Kuhn et al. | |
| 2008/0003994 A1 | 1/2008 | Skinner et al. | |
| 2009/0005039 A1 | 1/2009 | Kuhn | |
| 2009/0076906 A1 | 3/2009 | Kansal et al. | |
| 2010/0120407 A1 | 5/2010 | Kuhn | |
| 2010/0120428 A1 | 5/2010 | Kuhn | |
| 2010/0165938 A1 | 7/2010 | Kuhn et al. | |

FOREIGN PATENT DOCUMENTS

| | | |
|---|---|---|
| EP | 0825791 A1 | 2/1998 |
| EP | 0862104 A2 | 9/1998 |
| EP | 0820206 B1 | 3/2005 |
| EP | 1551193 A1 | 7/2005 |
| WO | WO99/55066 A1 | 10/1999 |
| WO | WO01/65411 A1 | 9/2001 |
| WO | WO2005/022375 A1 | 3/2005 |
| WO | WO2006/055716 A1 | 5/2006 |
| WO | WO2007/070510 A2 | 6/2007 |

OTHER PUBLICATIONS

Notification of Identification of Prior Art in Late Protest Under 37 CFR 1.201(a), filed Oct. 13, 2004, 1 page.
Protest for U.S. Appl. No. 09/794,082, filed Feb. 24, 2004, 4 pages.
Office Action for U.S. Appl. No. 09/850,940, date mailed Jul. 16, 2007, 9 pages.
Office Action for U.S. Appl. No. 09/850,940, date mailed Mar. 18, 2008, 11 pages.
Office Action for U.S. Appl. No. 12/133,281, date mailed Mar. 2, 2009, 9 pages.
Office Action for U.S. Appl. No. 12/133,281, mail date Sep. 17, 2010, 9 pages.
Office Action for U.S. Appl. No. 11/646,117, mail date Nov. 20, 2009, 10 pages.
Office Action for U.S. Appl. No. 11/218,346, mail date Jan. 15, 2010, 8 pages.
Office Action for U.S. Appl. No. 11/646,182, mail date Mar. 10, 2010, 14 pages.
Office Action for U.S. Appl. No. 12/133,281, mail date Mar. 16, 2010, 8 pages.

Office Action for U.S. Appl. No. 11/774,508, mail date Mar. 19, 2010, 11 pages.
Notice of Allowance for U.S. Appl. No. 12/473,177, mail date Oct. 29, 2010, 7 pages.
Notice of Allowance for U.S. Appl. No. 11/218,346, mail date Dec. 13, 2010, 7 pages.
Office Action for U.S. Appl. No. 09/850,940, mail date Apr. 12, 2010, 17 pages.
Office Action for U.S. Appl. No. 12/691,470, mail date Apr. 26, 2010, 9 pages.
Office Action for U.S. Appl. No. 12/473,177, mail date May 11, 2010, 7 pages.
Office Action for U.S. Appl. No. 11/646,177, mail date Jun. 22, 2010, 8 pages.
Office Action for U.S. Appl. No. 12/691,930, mail date Jun. 23, 2010, 9 pages.
Office Action for U.S. Appl. No. 11/218,346, mail date Jul. 9, 2010, 9 pages.
Office Action for U.S. Appl. No. 11/774,508, mail date Jul. 19, 2010, 10 pages.
Office Action for U.S. Appl. No. 12/133,281, mail date Aug. 12, 2010, 8 pages.
Office Action for U.S. Appl. No. 11/646,182, mail date Aug. 31, 2010, 14 pages.
Office Action for U.S. Appl. No. 12/646,750, mail date Sep. 20, 2010, 12 pages.
Office Action for U.S. Appl. No. 11/774,508, mail date Sep. 27, 2010, 11 pages.
Office Action for U.S. Appl. No. 12/691,470, mail date Oct. 18, 2010, 8 pages.
Office Action for U.S. Appl. No. 09/850,940, mail date Nov. 5, 2010, 18 pages.
Office Action for U.S. Appl. No. 12/691,930, mail date Dec. 16, 2010, 9 pages.
Office Action for U.S. Appl. No. 11/646,177, mail date Jan. 5, 2011, 9 pages.

* cited by examiner

REGISTRATION OF A MOBILE COMPUTING DEVICE FOR A SERVICE ON A WIRELESS NETWORK

CROSS-REFERENCE TO RELATED PATENT APPLICATIONS

This application is a divisional of prior application Ser. No. 11/646,182, filed Dec. 27, 2006, which is a continuation of prior application Ser. No. 09/850,940, filed May 8, 2001, both of which applications are incorporated by reference herein in their entireties.

BACKGROUND OF THE INVENTION

1. Field of Invention

This invention relates generally to account activations. The invention is more particularly related to activation of wireless accounts, particularly for hand held computers, mobile phones, and Personal Digital Assistants (PDAs) each having wireless capabilities.

2. Discussion of Background

Personal computer systems and their applications have become common tools in modern society. As organizational aids, many personal computer users use personal information management applications such as an address book and a daily organizer on their personal computers. Although such applications have proven useful for personal information management, their utility is limited by the fact that the person must be sitting at their personal computer system to access the information.

To remedy this limitation, palmtop computers, electronic organizers and other handheld devices, commonly known as Personal Digital Assistants (PDA's), have been introduced. The PDA is a computer that is small enough to be handheld or placed in a pocket, and allows a user and run various applications including personal information management applications such as address books, daily organizers, etc. These applications make people's lives easier.

A popular brand of PDA is the Palm™. However, the Palm™. is much more than a simple PDA. A basic configuration of the Palm™. 100 is shown in FIG. 1. This small, slim, device, about the size of your wallet, can hold 6000 addresses, 5 years of appointments, 1500 to-do items, 1500 memos, 200 e-mail messages, and can run many different software applications.

The front of the Palm™. 100 is a large LCD screen 110 which is touch-sensitive and allows a user to enter and manipulate data. A stylus (not shown) is provided with the Palm™ to help in making touch screen inputs. By using the stylus (or another handheld pointer) to interact with a touch-sensitive screen, a palmtop user can easily navigate through a host of built-in programs, software, and other applications.

Today, the Palm™ PDA and other handheld computing devices (Palm tops) offer Internet connectivity capabilities, as well as a vast array of hardware and software choices. Palmtops have evolved from simple organizers into a new kind of handheld that people use to instantly manage all kinds of information, from email, to medical data, to stock reports.

Mobile telephones (cell phones, PCS, satellite phones, etc) are also common tools in today's world. Many cell phones include rudimentary functionality for maintaining telephone numbers and other functionality to help alleviate the burdens associated with making calls and tracking phone numbers. In addition, the modern cell phone also has options for personalizing the style of various phone operations.

One trend in the PDA marketplace is the integration of radio based services into the PDA. One pioneering example is the Palm VIIx which includes RF capabilities to access a wireless network (palm.net) to provide email and web-clipping internet access to users.

However, the networks that service the PDA marketplace have seen significant demand and increased traffic. Generally, costs are incurred for each of the messages transmitted or received. During activation of the PDA, significant amounts of traffic are produced to register the radio device within the PDA, collect billing information, and other data needed to activate a wireless account.

Additional problems also occur when user's attempt to activate, but, for example might not have the needed information on hand, or incorrectly enter information. Resulting error messages and transactions tie up valuable air time and could result in unintended actions (system hangups, etc.).

SUMMARY OF THE INVENTION

A system and method are disclosed for registering a mobile computing device for a service on a wireless network. The method comprises receiving user information for a user of the mobile computing device and creating an account based on the user information. The method comprises receiving a first key and serial number from the mobile computing device at a network node and generating a second key based on an encryption of a stored serial number of the mobile computing device. Based on an evaluation of the first and second keys and received and stored serial numbers, the mobile computing device is registered on the wireless network for the service.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
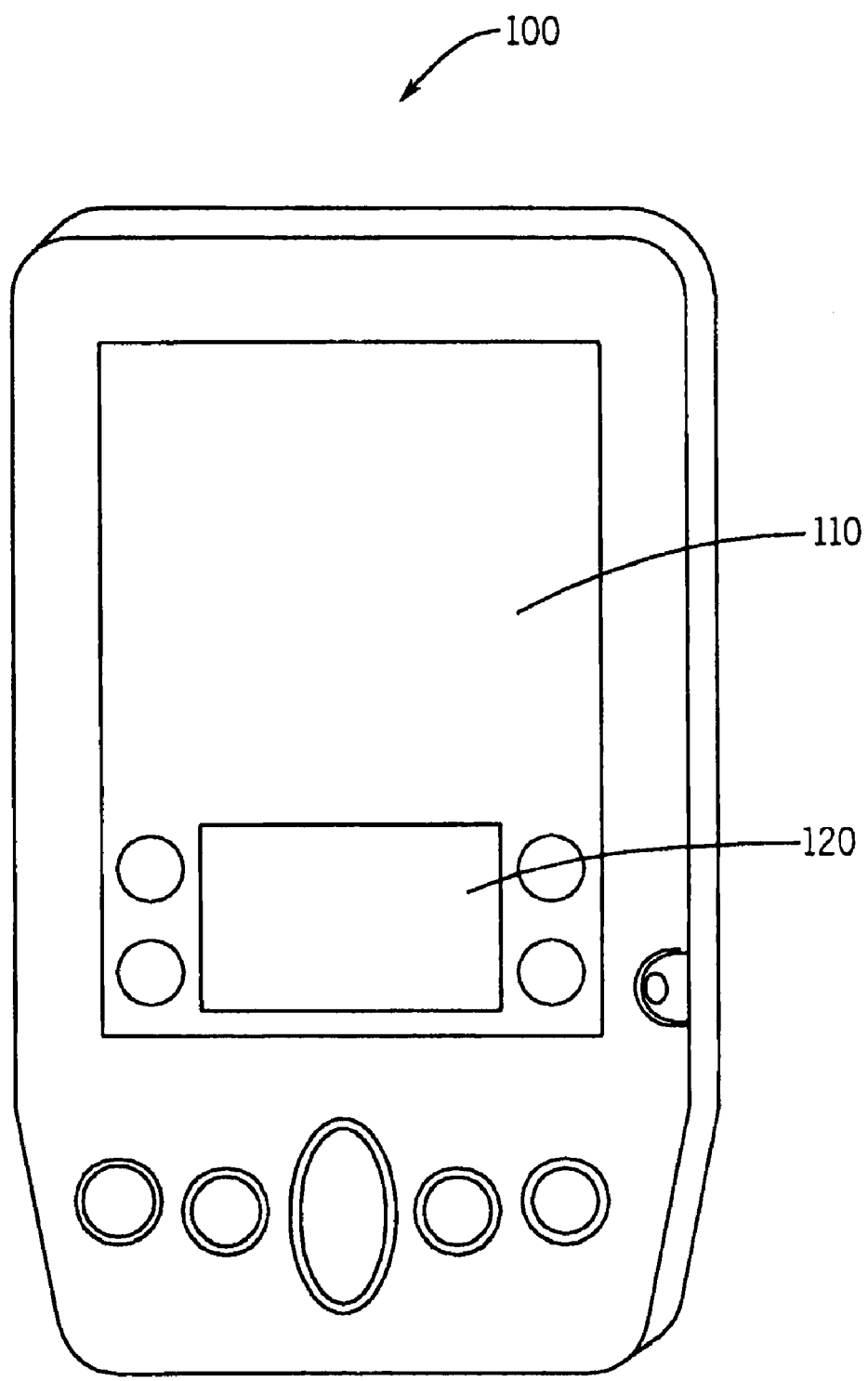
FIG. 1 is a Palm™ handheld computer.
Figure 2:
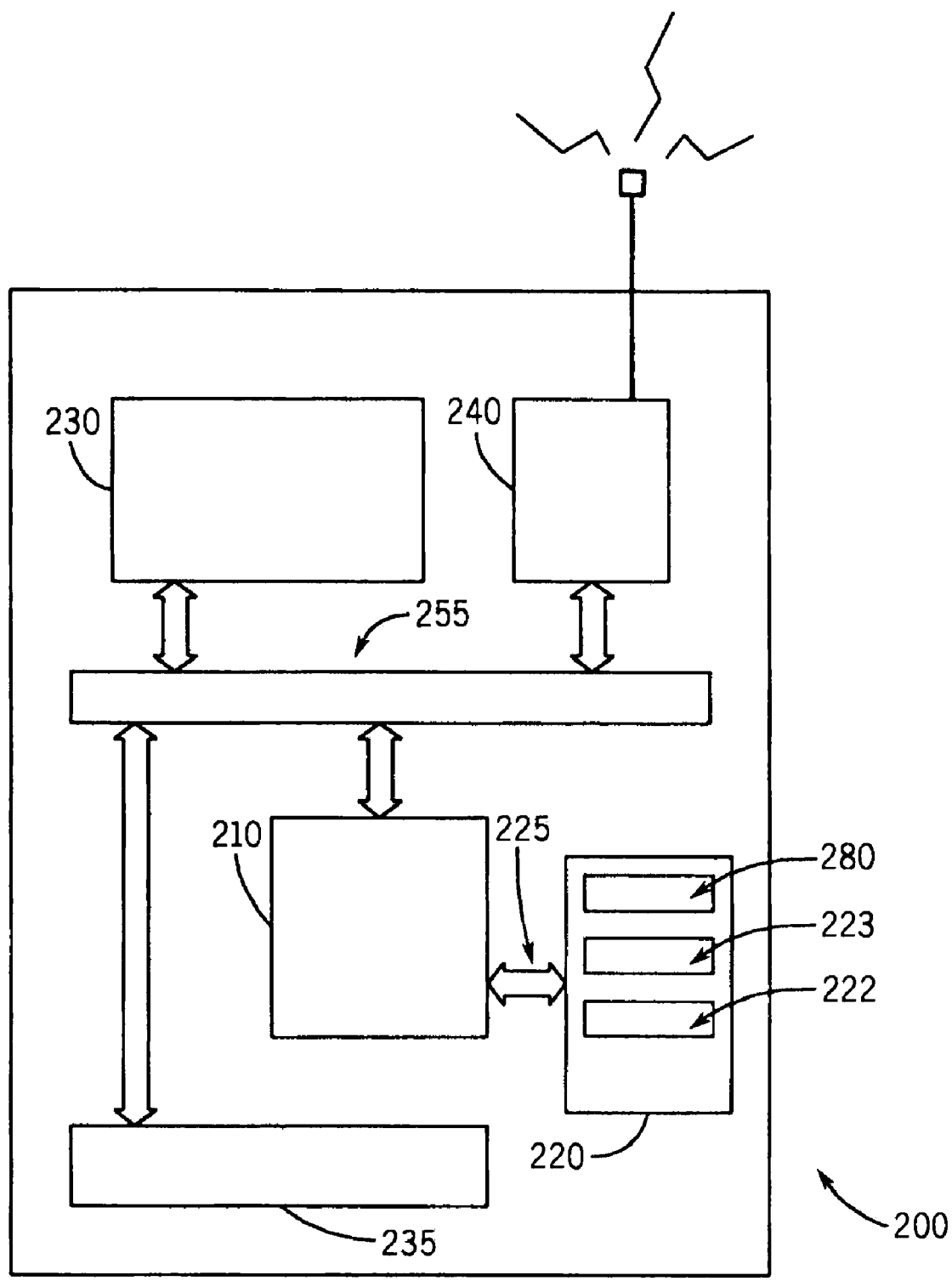
FIG. 2 is a block diagram of selected components of an embodiment of a PDA device with radio frequency (rf) capabilities according to the present invention.

Referring again to the drawings, wherein like reference numerals designate identical or corresponding parts, and more particularly to FIG. 2 thereof, there is illustrated a block diagram of selected components of a handheld computer 200 that includes RF capabilities. The handheld computer 200 includes a processing unit 210, for executing applications and an operating system of the computer 200, a memory device 220 for storing the operating system, data, and the applications. A memory bus 225 is utilized to transfer programs and data from memory to the processing unit 210.

A display screen 230 is provided (preferably a touch sensitive screen) for display of Operating System prompts, buttons, icons, application screens, and other data, and for providing user inputs via tapping or touching (or drawing in the Graffiti™ area 120) via a stylus or other touch mechanism. Hardware interface 235 connects to physical hard buttons and switches located on a body of the computer 200 and provides signals to applications running on the processing unit 210.

An RF capable device 240 provides connectivity to a cellular telephone network (not shown) or other RF network. The RF capable device 240 may, for example, be a cellular telephone or a Palm.net™ enabled radio device for wireless web-clipping, email, and other wireless connectivity communications. The RF capable device may also be a wireless Internet enabled radio device, such as Ricochet™, etc., pager, wireless e-mail device, Family Radio System (FRS), or any of different mobile telephones, including cellular, satellite, PCS, TDMA, GSM, etc. Although the RF capable device is shown as an internal component to the computer 200, the RF device may be contained in sled or other configuration that attaches to an exterior of the computer 200, or may be a separate device connected to the computer via a cable or other connection (wireless, IR, RS232, USB, Firewire, network connection, etc., for example). Preferably, the RF device is a Mobitrex enabled radio device.

A system bus 255 carries data and commands to/from the processing unit 210 from/to other devices within or attached to the computer 200. For example, user applications running on the computer 200 send application screens and other data outputs to display screen 230 for display via the system bus 255. User inputs (Graffit™) area drawing, or tap selection, for example) are detected by the screen 230 and sent to the processing unit 210 via the system bus 255.

In addition to the operating system and user selected applications, an RF application, which may be a phone or other device that uses the RF device 240, having instructions stored in memory 220, executes on the processing unit 210. Alternatively, another hardware device may be included in computer 200 that utilizes RF device 240.

In one embodiment, the RF application is a phone device and the RF device is a wireless telephone. Phone calls from a network and directed toward the RF device 240 are detected by the RF device and sent, in the form of an incoming call notification, to the phone device executing on the processing unit 210. The phone device processes the incoming call notification by notifying the user by an audio output such as ringing (not shown).

The phone device also includes a method for the user to answer the incoming call. For example, tapping on a phone icon, or pressing a hard button designated or preprogrammed for answering a call signals the phone device to send instructions (via system bus 255) to the RF device 240 to answer the call.

Outgoing calls are placed by a user by entering digits of the number to be dialed and pressing a call icon, for example. The dialed digits are sent to the RF device 240 along with instructions needed to configure the RF device 240 for an outgoing call. Alternatively, the RF application is a web, palm.net, e-mail, or other RF communication device, appropriate instructions are sent to the RF device 240 to instruct or otherwise administer the communication. The Administration of the communication may include, for example, communication of content and a destination address to send the content to the RF device 240, or receiving an email and storing it in memory (memory 220, for example) and/or displaying it to a user. Several examples of a configuration and details of devices for connecting or integrating voice function devices to a PDA are described in Maes et al., application Ser. No. 09/709,225, entitled, "INTEGRATING VOICE FUNCTION INTO A PDA," filed Sep. 29, 2000, the contents of which are incorporated herein by reference in their entirety.

In another embodiment, the RF device is a mobitex enabled radio device. The software programs stored in memory include a Mobitex protocol stack. Messages sent from the computer 200 are directed toward the Mobitex protocol stack which formats the messages and prepares them for transmission by the radio device. The messages may be, for example, any of e-mails, instant messages, voice over IP (or other protocol), web clippings, web clipping requests, HTTP, HTTP/IP, FTP, SNMP, general packet traffic, or other data message types.

Preferably, the computer 200 is a PDA device having interactive hardware and software that perform functions such as maintaining calendars, phone lists, voice or audio related functions integrated or attachably integrated (via a connector device or sled, for example, not shown), and at least one of these configured for use with the RF capabilities of the PDA.

The software, including a phone or other RF applications, operating system, and other general applications (word processors, spreadsheets, games, databases, etc.) 223 are stored in memory device 220 along with program data, graphics, and other data and executed on the processing unit 210.

Processing unit 210 executes the software, including the operating system (OS, including a User Interface (UI) of the OS), and other user applications as directed by user inputs. The user applications display outputs on the display screen 230 and receive inputs from taps, tap & hold, and writing operations on the display screen and from programmed hard buttons attached to the hardware interface 235.

Memory device 220 is constructed of RAM memory or ROM memory, or a combination of both ROM and RAM, and may include flash memory components. In one embodiment, an operating system 222 resides on a ROM portion of the memory 220 and provides executable instructions to perform operating system functions of the handheld computer 200. User applications 223 generally reside in a RAM portion of the memory 220. The present invention is contained in a program stored on ROM. However, the invention may also be programmed within the operating system 222, or may be a separate program contained in RAM or any other storage device (program 280, for example). When the present invention is invoked, computer instructions from the operating system 222 or program 280 are executed on processing unit 210 which issue commands that control the RF device 240 (e.g., enable/disable), or save or implement a schedule for enabling/disabling the RF device 240.

The above describes a basic environment in which the present invention is practiced. However, it should be understood that many different electronic devices, including cell phones, PDA's of different configurations and various integrated or attached devices and/or RF capabilities are also suitable environments in which the present invention may also be practiced.

Figure 3:
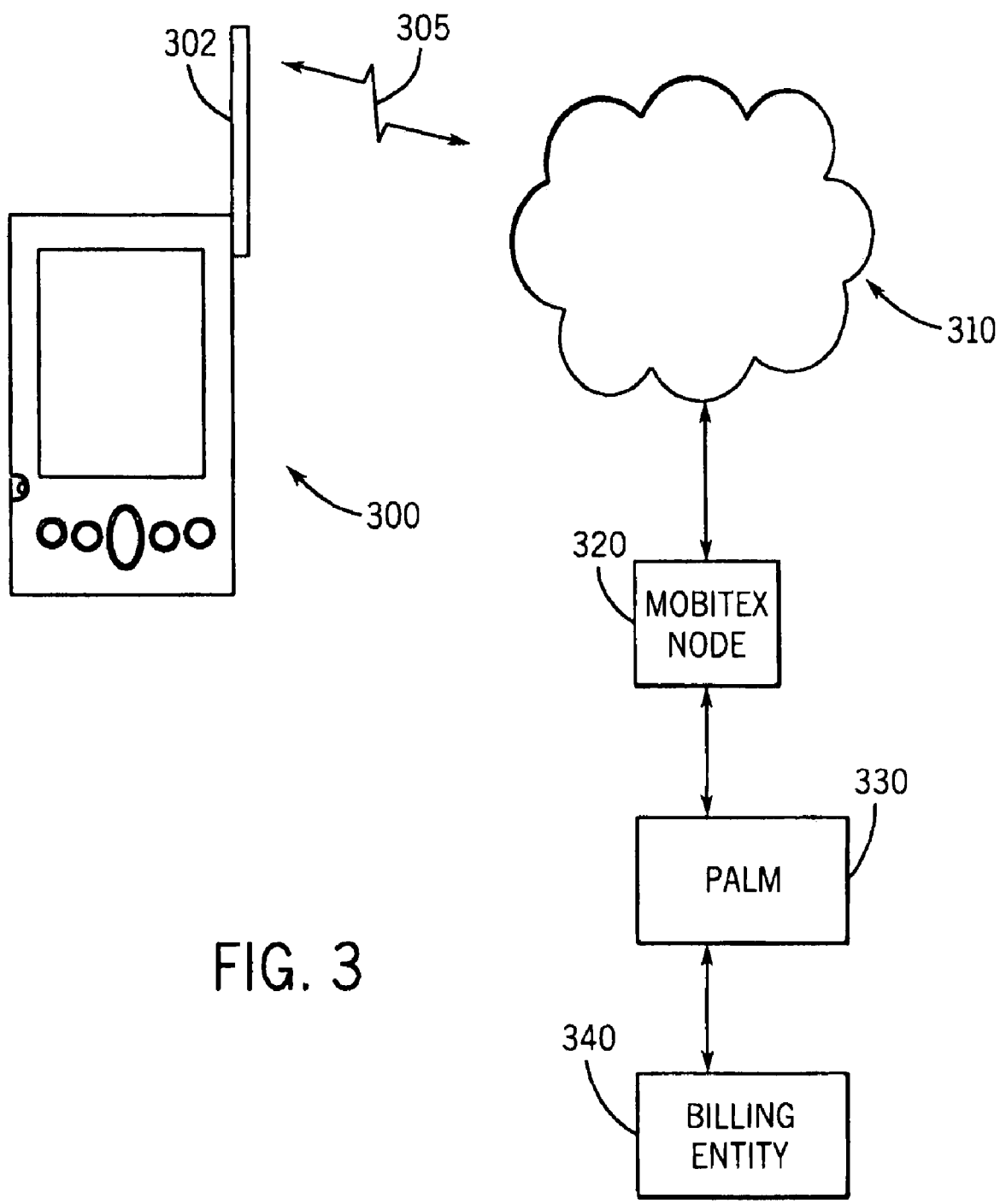
FIG. 3 is a drawing illustrating components and data flow for a conventional wireless device activation.

FIG. 3 is a drawing illustrating components and data flow for a conventional wireless device activation. A wireless enabled device 300 (Palm computer, in this example) communicates via a wireless radio (RF device) to a wireless network 310. The wireless network is, for example, a Mobitex network. Wireless communications 305 from the device 300 include, for example, registration and activation information, e-mails, voicemail, and web clipping.

The registration and activation procedures include initial connection to the network (generally initiated by raising antenna 302), identification of the device (transmitting an HSN number of the RF device, for example), Querying the user for additional information including identification, billing information, etc., and, if an account is already established, determination of an account associated with the device. The communication are sent to/from the wireless device 300 via a wireless network 310. The wireless network is built and maintained by a carrier (e.g. Mobitex).

A number of nodes 320 (one node shown for simplicity), each pass the wireless communication until it reaches either the wireless device or a service provider 330. The service provider 330 is responsible for registering a user, setting up accounts and verifying that the wireless network should carry communications originating from or provided to the wireless device 300. Generally, the wireless network carrier bills the service provider for airtime and/or amount of message traffic carried for devices communicating with the service provider. The service provider then charges each wireless user on a flat rate, monthly charge+airtime, by the amount of data bytes transferred to/from the user's wireless device, or any combination of these or other billing techniques.

In the registration process, a service provider contacts a billing entity 340 (e.g., any of a credit agency, credit card, bank, etc.) to arrange for automatic payment or determine the credit worthiness or financial ability of a user to pay his/her bill. If the user does not meet criteria required for setting up an account the user is notified by way of return message to the wireless device.

If the service provider favorably evaluates the potential user, an account is set up for the user and activated. The account is set up using the user provided identification, billing information, and radio identification. The user is notified of successful account activation on the wireless device 300 and the user is logged on to the network and then able to access other devices coupled to the wireless network 310.

However, the process illustrated in FIG. 3 requires a substantial amount of traffic to be generated before the account is fully set-up and significant costs are associated with that traffic, particularly if the registration process is not completed or if the user is rejected based on insufficient funds or lack of credit.

Figure 4A:
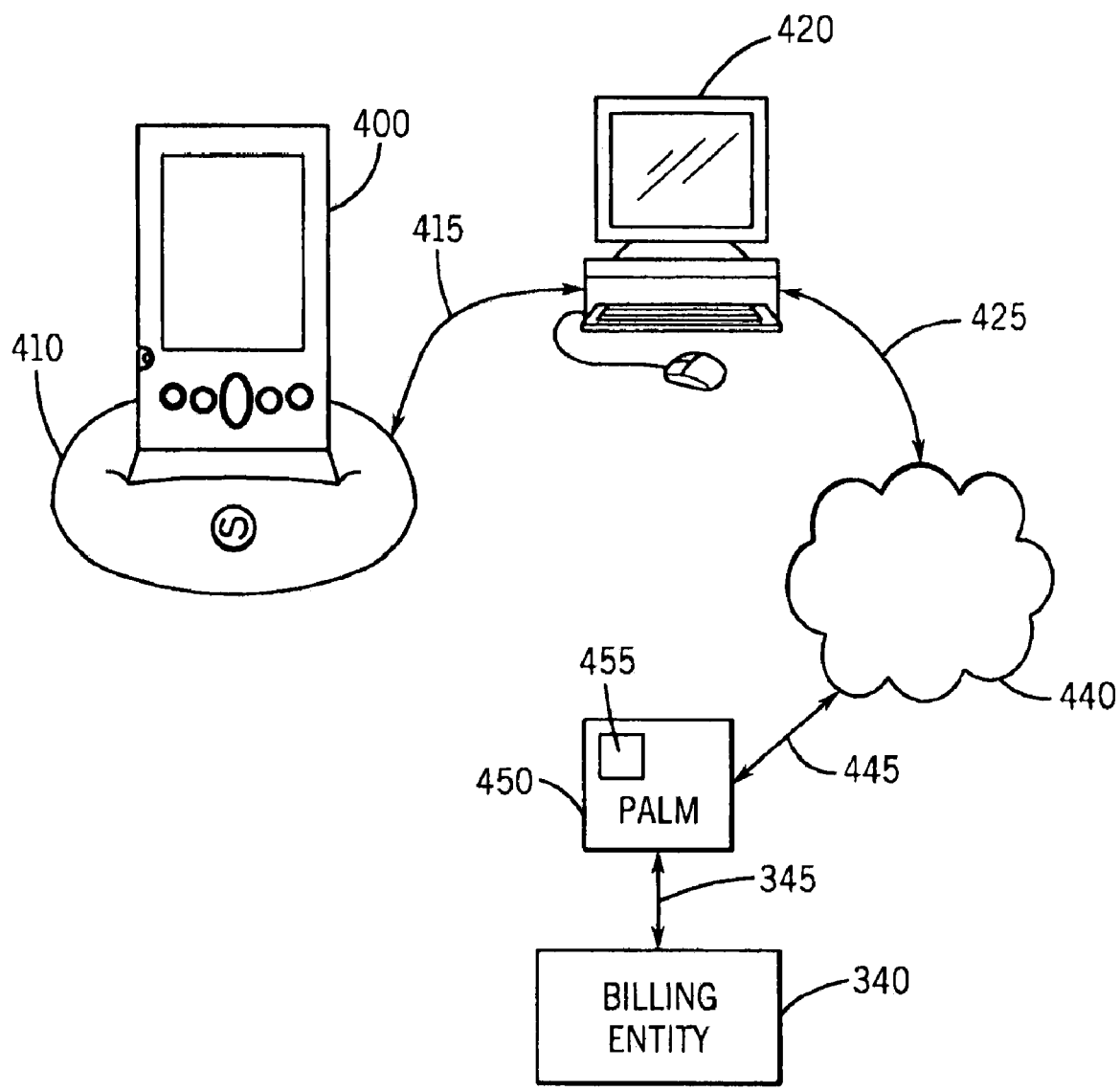
FIG. 4A is a drawing illustrating components and data flow for an account setup process according to the present invention.

FIG. 4A is a drawing illustrating components and data flow for an account setup process according to an embodiment of the present invention. A user's wireless enabled device 400 is to be registered for access to a wireless network. The user uses a computer device 420 to log on to the internet 440 (flow 425) and access a service providers web site 450 (flow 445) which contains a web-registration procedure 455. The web registration procedure collects all the information needed to create an account for the user, including user identification, radio identification, and billing information (credit card No., bank account, etc.). The web registration procedure communicates with a billing entity (flow 345, "billing entity" may comprise one or more billing entities, e.g., credit card agency, bank, etc.) as needed to determine whether the user is qualified to activate an account. If qualified, the service provider creates an activation key that is sent back to the user for use in activating the account on the wireless network.

In one embodiment, the transfer of information about the user and the user's wireless device is performed by web page interaction where the user fills out one or more web pages having input areas for collecting the user's information including an identification of the wireless device (the RF device HSN number, for example). However, preferably, at least part of the information collected by the service provider web site is transferred to the service provider web site via a Hotsync™ operation between the user's wireless device 400 and the service provider web server 450 (combined flows 415, 425, and 445). The Hotsync™ operation is facilitated, for example, via a cradle 410 connected to the user's computer 420, which is in turn coupled to the internet and the service provider's web server 450. In yet another embodiment, all the necessary data is exchanged via a telephone call between the user and service provider, the data being exchanged via voice between the user for operator input, or by punching corresponding telephone dial pad digits in a touch pad automated entry system.

After the user's information has been collected by the service provider (450, for example), the service provider forwards required information to a billing entity (340, for example) to determine creditworthiness of the user. If the user has acceptable credit, the service provider 450 registers an account in the users name and forwards an activation key to the user.

Figure 4B:
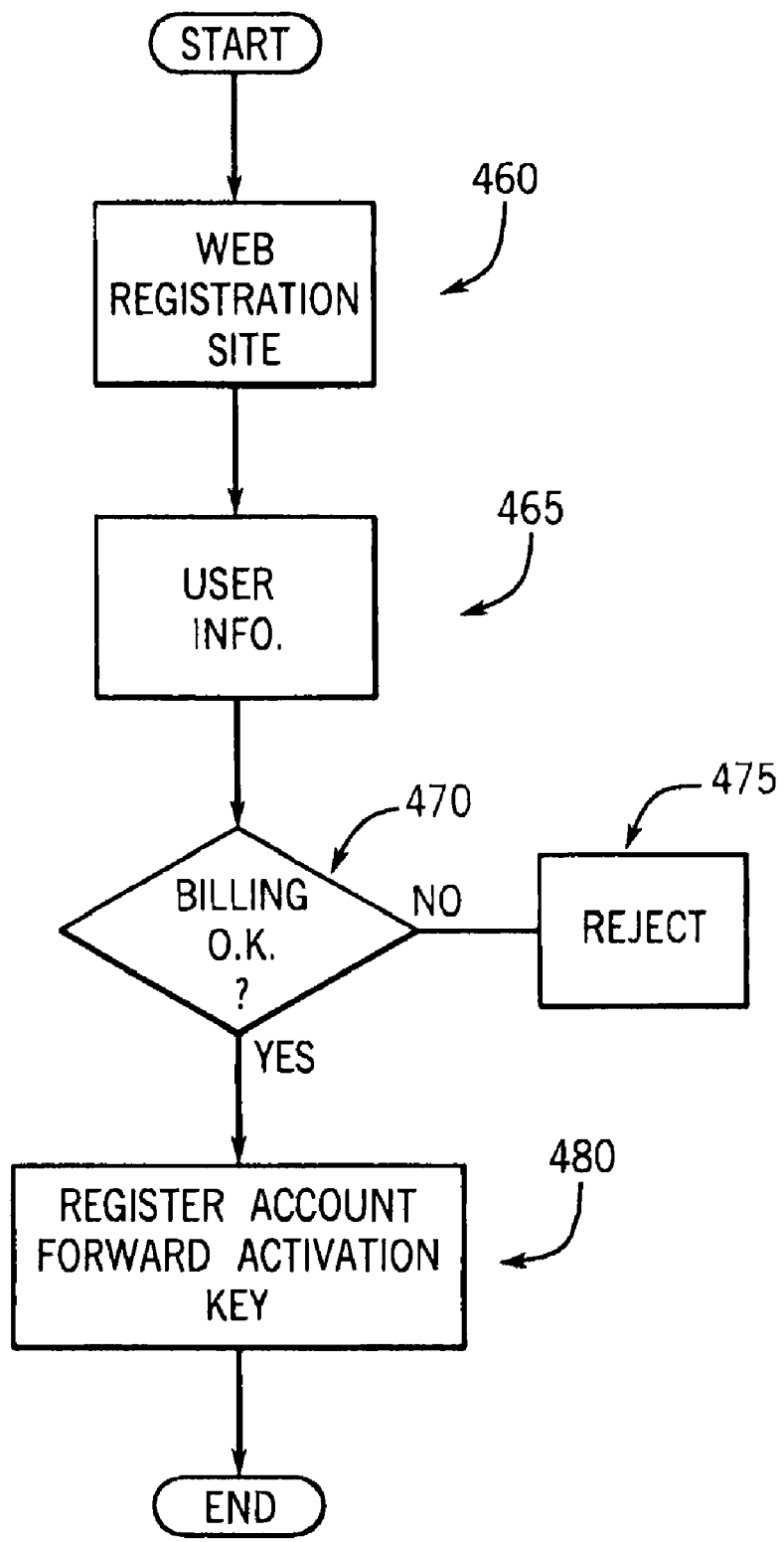
FIG. 4B is a flow chart illustrating an embodiment of an account registration process according to the present invention.

FIG. 4B is a flow chart illustrating an embodiment of an account registration process according to the present invention. At step 460, the user contacts a service provider for account registration purposes. Preferably, the account registration is performed via a web registration site on the Internet.

At step 465, the user is queried for personal information, name, etc., or other information needed to establish an account. One example of a set of information needed to establish account is shown in Table 1 below:

TABLE 1

Personal And Radio Information

Name: _____
Address: _____
Billing Address (if different from Address): _____

<Mastercard>  <Visa>  <American Express>  <Other>
Credit Card No: _____
Bank and Checking Account No.: _____
Raido ID (HSN No.): _____

The personal and radio information may be collected by fill in boxes on the web registration web site, or, in the case of a telephone call activation procedure, the user may be prompted by a voice response, or telephone keypad response system. In another alternative, the user's information may be provided via snail mail or an e-mail to the service provider.

Once collected, the user's information is forwarded to a billing agency, credit card company, or other credit institution for evaluation as the user's qualifications or financial ability to maintain an account in good standing (step 470). If the user is favorably evaluated, the process continues, if not, the user is sent a rejection message (step 475). The rejection message may take the form of a rejection page on the web registration site, an email, or a voice message, depending on how the user's information was collected, or via a standard rejection procedure (i.e, rejections always mailed, while acceptance may notified immediately if the evaluation also occurs while the user is online (web or telephone registrations, for example)).

If the user is favorably evaluated for an account, an account is registered in the user's name and an activation key is assigned to the user (step 480). Preferably, the user's acceptance notification includes the activation key. In one embodiment, the user retains the activation key and uses it in an activation procedure. In another embodiment, the activation key is hotsynced to a file in the users handheld computer 400.

Figure 5A:
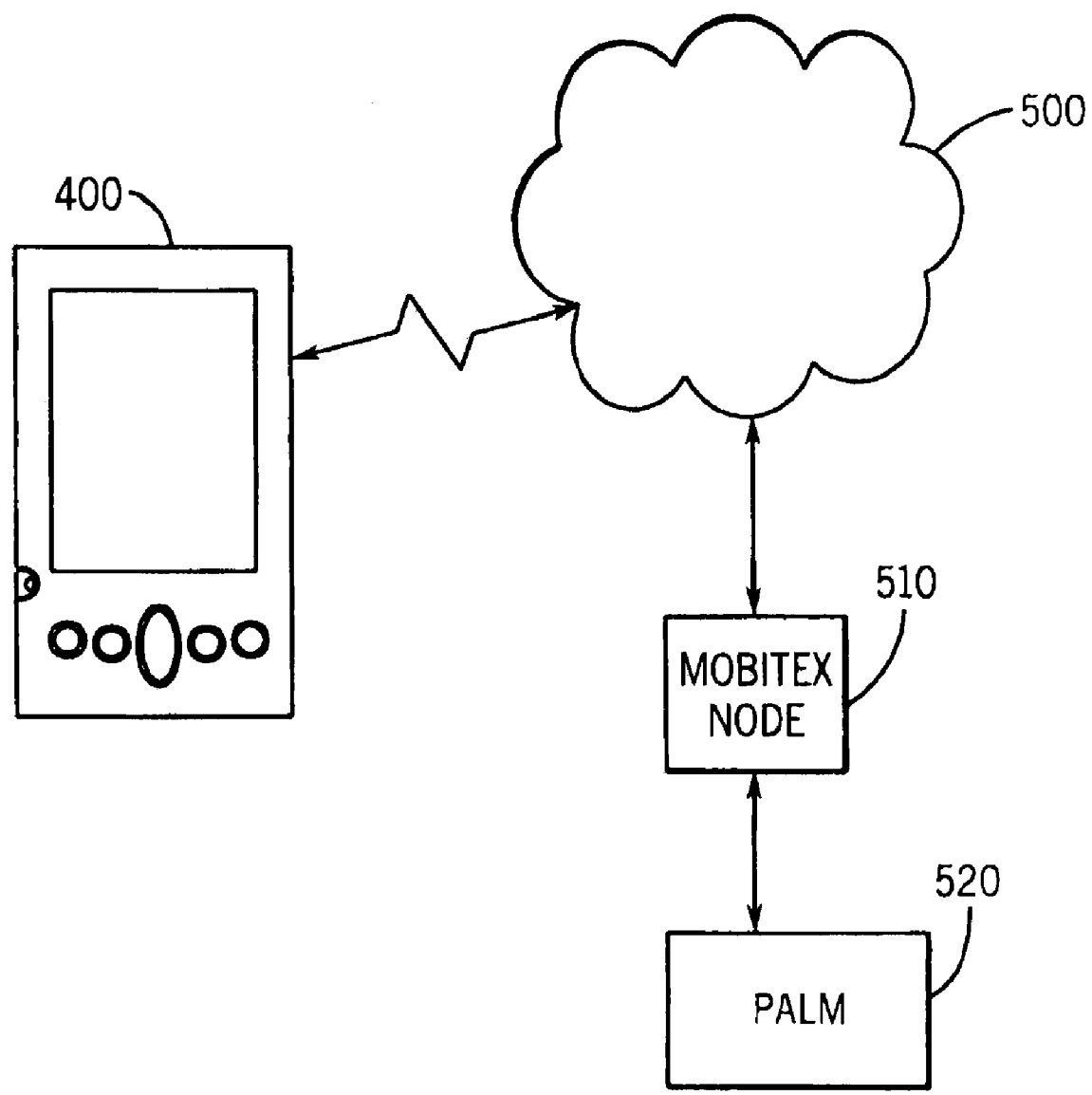
FIG. 5A is a drawing illustrating components and data flow in an account activation process according to an embodiment of the present invention.

FIG. 5A is a drawing illustrating components and data flow in an account activation process according to an embodiment of the present invention. The user initiates a device or program on a handheld computer (e.g., Palm VIIx™) that requires a network connection. The device/program may be any of the network enabled devices discussed herein, including cell phone, instant messenger, e-mail programs, etc.

The device/program sends a message to a Mobitex protocol stack requesting network services. The protocol stack checks to see if the wireless account has been activated. If not activated, the protocol stack initiates an activation subroutine to collect the activation key. In one embodiment, the activation subroutine reads a file (e.g. activation key file) that was used to store the activation key. As discussed above, the activation key file may have been downloaded by the computer 420 and placed on the handheld computer 400, or directly hotsynced from the service provider web site to the handheld.

Figure 6:
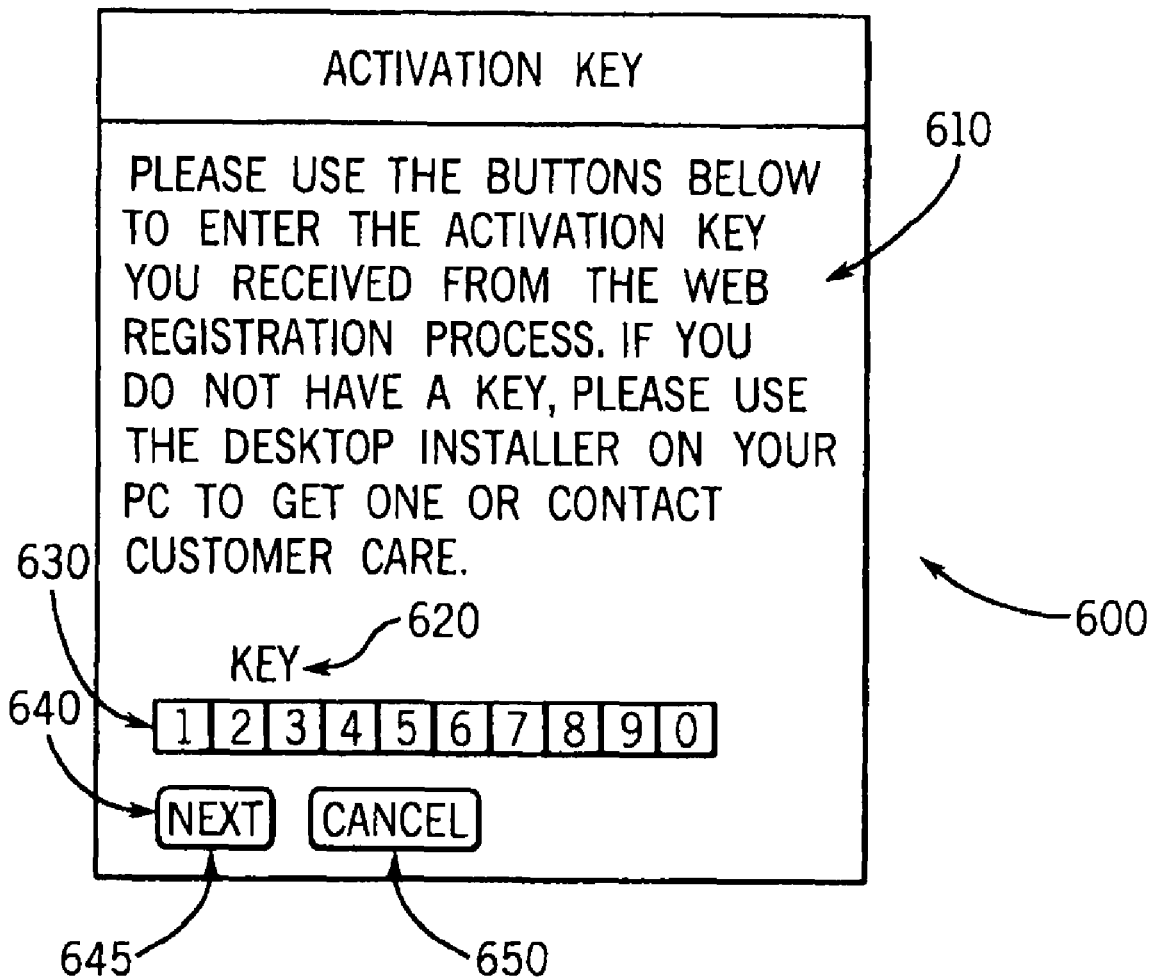
FIG. 6 is a screen shot of an activation screen according to an embodiment of the present invention.

In another embodiment, the activation subroutine displays a display screen that prompts the user to input the activation key. FIG. 6 is a screen shot of an activation screen 600 according to an embodiment of the present invention. The activation screen 600 includes instructional text 610 explaining what is needed, a key entry area 620 for verifying or displaying the entered activation key, a touch sensitive keypad for entering activation key digits, a next button 640, and cancel button 650. The next button 640 includes a designator 645 that identifies that the "next" transaction will proceed over the over-the-air. Specifically, the activation request is generated and transmitted to the activation agent on the network.

The activation key provides a one-to-one code that identifies the users pre-registered account (billing information, etc.) and the Radio Identification (HSN, for example) of the RF device used in the handheld computer. Preferably, this activation key can be generated on the device to check validity before transmission. If the registration key is improperly entered and doesn't equal the key generated on the device, the registration is rejected without invoking any network traffic.

The present inventors have used a hash of the HSN number to generate the activation key at both the pre-registration and for checking the activation key entered on the handheld. However, any algorithm that produces a unique value based on the HSN or other radio identifier may be utilized to generate the activation key.

Once the activation key is read from the file or properly entered by the user, the activation key and a network connection request is forwarded to the network 500. The network passes the activation key and connection request (including radio ID) to a network node (node 510, for example) that evaluates the activation key and radio ID by searching a table of radio IDs (as entered by the web-based process), and matches the table retrieved radio ID to the user's handheld computer radio ID. If the radio IDs match, the connection is granted, and the user's handheld computer begins communicating with the service provider (520, for example) over the wireless network 500 (and billing to the user's pre-registered account).

Figure 5B:
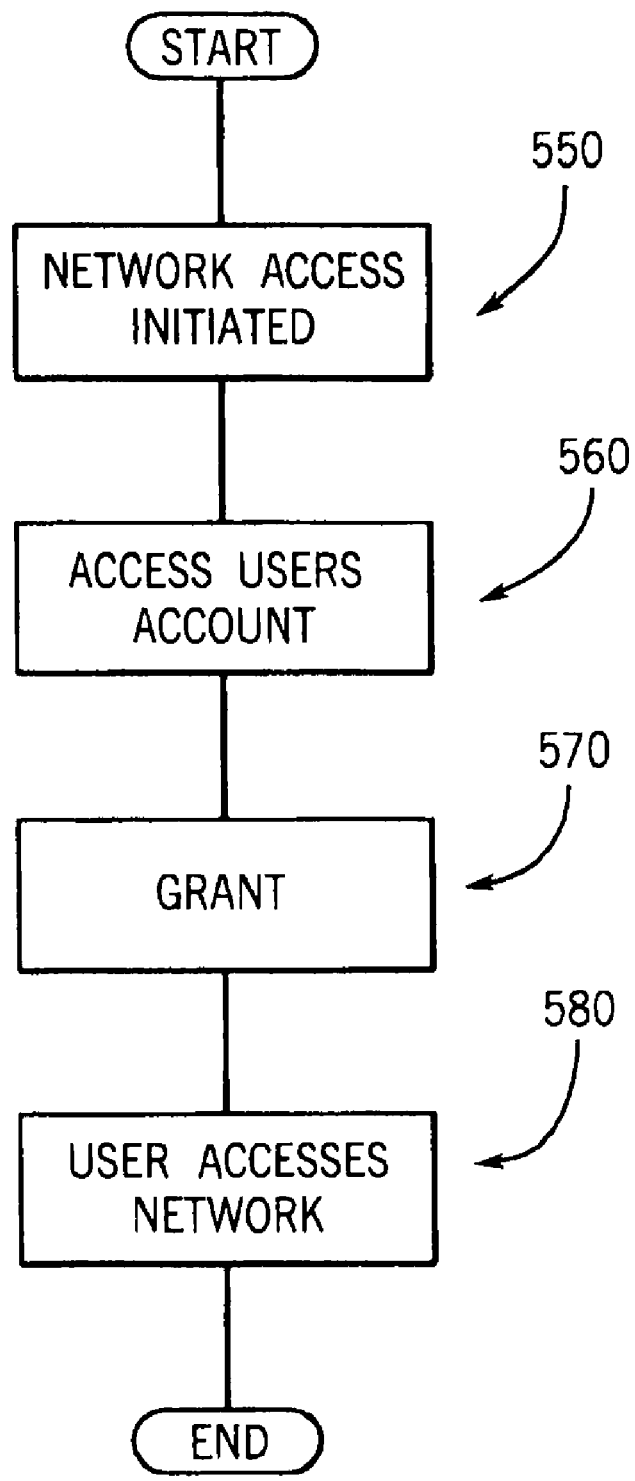
FIG. 5B is a flow chart illustrating an embodiment of an account activation process according to the present invention.

FIG. 5B is a flow chart illustrating an embodiment of an account activation process according to the present invention At step 500, the user initiates a program or device on the handheld computer (500, for example) that requires a wireless network connection. The programming within the user's handheld computer retrieves (from the user) an activation key provided when the user's account was registered and provides the activation key along with a network connection request to the network (step 550).

The network accesses the user's account to verify the account pre-registration (step 560). After verification, the network issues a grant providing the handheld device with a wireless network connection (step 570), and the handheld device begins communicating with the network as messages are sent or received (messages, e-mails, connection maintenance messages, etc., step 580).

Although the present invention has been fully described with reference to a handheld computer, it is intended that the same processes and devices discussed herein may be applied to device other than handheld, including desktop devices/computers, vehicle mounted systems (automobile dash board, airplane instrument panel, for example). In addition, while the present invention has great advantages in RF based wireless devices, these same advantages will be realized in wireless systems of other mediums, including wireless IR. Furthermore, the present invention should not be limited to wireless systems as advantages will also be realized when practiced in landline or other wire-based systems (copper, twisted pair, cable, etc.).

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, collecting user information, approving accounts, generating (e.g., hashing) account information to produce an activation key, retrieving activation keys from users, requesting, approving, and maintaining wireless network connections, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method operating on a server computer for registering a mobile computing device for a service on a wireless network, comprising:
   receiving user information for a user of the mobile computing device by the server computer, wherein the user information comprises a first serial number;
   storing the user information using the server computer;
   creating an account based on the user information by the server computer;
   receiving a first key and a second serial number from the mobile computing device at the server computer;
   storing the first key and the second serial number using the server computer;
   generating a second key by encrypting the first serial number of the mobile computing device by the server computer;
   storing the second key using the server computer; and
   based on an evaluation of the first key and first and second serial numbers by the server computer, registering the mobile computing device on the wireless network for the service.

2. The method of claim 1, wherein the received user information comprises a billing address for the user.

3. The method of claim 1, further comprising forwarding the user information to a financial institution to evaluate the user's financial ability.

4. The method of claim 1, wherein the first key and serial number are received along with a network connection request.

5. The method of claim 1, wherein the service comprises a data service.

6. The method of claim 5, wherein the data service comprises e-mail and internet browsing.

7. The method of claim 1, wherein the wireless network comprises a cellular network.

8. The method of claim 1, further comprising:
   receiving a subsequent network connection request for a data service from the mobile computing device;
   verifying account registration; and
   providing the mobile computing device with a wireless network connection for the data service.

9. The method of claim 1, wherein the encryption comprises a hash function.

10. The method of claim 1, wherein the received user information comprises a name and an address for the user.

11. A system for registering a mobile computing device for a service on a wireless network, comprising:
    a server computer comprising a memory storing instructions which when executed by a processor cause the server computer to perform the following steps of:
      receiving user information for a user of the mobile computing device, wherein the user information comprises a first serial number;
      storing the user information in a memory;
      creating an account based on the user information;
      receiving a first key and a second serial number from the mobile computing device;
      storing the first key and the second serial number;
      generating a second key by encrypting the first serial number of the mobile computing device;
      storing the second key; and
      based on an evaluation of the first key and first and second serial numbers, registering the mobile computing device on the wireless network for the service.

12. The system of claim 11, wherein the received user information comprises a billing address for the user.

13. The system of claim 11, wherein the instructions when executed by the processor cause the server computer to perform the step of: forwarding the user information to a financial institution to evaluate the user's financial ability.

14. The system of claim 11, wherein the first key and second serial number are received along with a network connection request.

15. The system of claim 11, wherein the service comprises a data service.

16. The system of claim 15, wherein the data service comprises e-mail and internet browsing.

17. The system of claim 11, wherein the wireless network comprises a cellular network.

18. The system of claim 11, wherein the instructions when executed by the processor cause the server computer to perform the steps of:
    receiving a subsequent network connection request for a data service from the mobile computing device;
    verifying account registration; and
    providing the mobile computing device with a wireless network connection for the data service.

19. The system of claim 11, wherein the encryption comprises a hash function.

20. The system of claim 11, wherein the received user information comprises a name and an address for the user.

* * * * *